(12) United States Patent
Sarmova

(10) Patent No.: US 10,611,226 B2
(45) Date of Patent: Apr. 7, 2020

(54) QUICK-DEPLOYING CAR COVER

(71) Applicant: Nadejda K. Sarmova, Golden, CO (US)

(72) Inventor: Nadejda K. Sarmova, Golden, CO (US)

(*) Notice: Subject to any disclaimer, the term of this patent is extended or adjusted under 35 U.S.C. 154(b) by 43 days.

(21) Appl. No.: 15/819,820

(22) Filed: Nov. 21, 2017

(65) Prior Publication Data
US 2018/0141422 A1 May 24, 2018

Related U.S. Application Data

(60) Provisional application No. 62/424,668, filed on Nov. 21, 2016.

(51) Int. Cl.
B60J 11/04 (2006.01)

(52) U.S. Cl.
CPC .................... B60J 11/04 (2013.01)

(58) Field of Classification Search
CPC .......................................... B60J 11/04
USPC ............... 296/136.01, 136.07, 136.13, 95.1
See application file for complete search history.

(56) References Cited

U.S. PATENT DOCUMENTS

| 4,951,993 | A | * | 8/1990 | Taboada | B60J 11/00 150/166 |
| 5,401,074 | A | * | 3/1995 | Timerman | B60J 11/00 160/370.21 |
| 5,413,396 | A | * | 5/1995 | Poznansky | B60J 11/00 150/166 |
| 5,516,181 | A | * | 5/1996 | Thompson | B60J 11/02 150/166 |
| 6,997,503 | B2 | * | 2/2006 | Fukagawa | B60J 11/00 150/166 |
| 7,243,975 | B2 | * | 7/2007 | Harcourt | B60J 11/00 296/136.01 |
| 7,431,375 | B1 | * | 10/2008 | Julius | B60J 11/06 150/168 |
| 8,910,997 | B2 | * | 12/2014 | Featherman | B60J 11/04 150/166 |
| 9,248,730 | B2 | * | 2/2016 | Hu | B60J 11/04 |
| 9,770,966 | B1 | * | 9/2017 | Gill | B60J 11/04 |
| 2002/0157696 | A1 | * | 10/2002 | O'Brien | B60J 11/00 135/87 |

OTHER PUBLICATIONS

Website: http://www.hailarmorcovers.com:80/ (via WayBackMachine).

* cited by examiner

Primary Examiner — Jason S Morrow
Assistant Examiner — E Turner Hicks
(74) Attorney, Agent, or Firm — Macheledt Bales LLP; Jennifer L. Bales

(57) ABSTRACT

A car cover is formed of top panels configured to unfold and refold in accordion manner along fold lines. It attaches to the front and back of the car. It includes grommets in the panels and a refolded cord threaded though the grommets which refolds the cover when pulled. It also includes wings formed along the edges of the top panels and configured to selectively either extend outward from the top panels or fold downward over car sides.

19 Claims, 10 Drawing Sheets

QUICK-DEPLOYING CAR COVER

BACKGROUND OF THE INVENTION

Field of the Invention

The present invention relates to car covers. In particular, the present invention relates to quick-deploying car covers to shield cars from hail and the like.

Discussion of Related Art

Currently, car covers take several minutes to deploy, and don't sufficiently protect cars from hail, as they are generally one layer of flexible material.

A need remains in the art for a car cover that can be deployed quickly and will protect the car from hail and other adverse conditions.

SUMMARY OF THE INVENTION

It is an object of the present invention to provide a car cover that can be deployed quickly and will protect the car form hail and other adverse conditions.

An embodiment of the present invention comprises an accordion-like cover which attaches to the back end of the car, inside the trunk and is unfolded to cover the car. The other end of the cover is then attached to the front end of the car. A handle is provided for the user to pull the cover over the car.

One end of the cover may be attached to the rear of the car by securing one or more attachment hooks inside the trunk of the car, the door handles of the car, and the side mirrors.

DETAILED DESCRIPTION OF THE INVENTION

The following table lists elements of the present invention along with their reference numbers.

| Reference No. | Element |
| --- | --- |
| 100 | Car cover |
| 101 | Cover storage case |
| 102 | Cover deploying handle |
| 103 | Top panels |
| 104 | Cover deploying handle strap |
| 105 | Cover back end securing strap |
| 106 | Trunk strap |
| 107 | Hook-and-loop first side |
| 108 | Hook-and-loop second side |
| 109 | Elastic side-view mirror straps |
| 110 | Wing rod |
| 111 | Securing slit |
| 112 | Grommets |
| 113 | Clip/hook |
| 114 | Clips |
| 115 | Accordion folding lines |
| 119 | Car door handle strap for wing |
| 120 | Car edge fold line |
| 121 | Wings |
| 123 | Front hook |
| 124 | Front hook strap |
| 125 | Refolding cord grommets |
| 126 | Refolding cord |
| 127 | Reinforcement openings for refolding cord |
| 128 | Reinforcement panel pocket |
| 130 | Refolding cord portion |
| 136 | Front wrap-around panel |
| 137 | Rear wrap-around panel |
| 200 | Car |
| 201 | Front of car |
| 202 | Hood |
| 203 | Rear of car |
| 204 | Trunk |
| 208 | Side mirror |
| 218 | Car handle |
| 300 | Second embodiment of car cover |
| 336 | Front panel |
| 337 | Rear panel |

Figure 1:
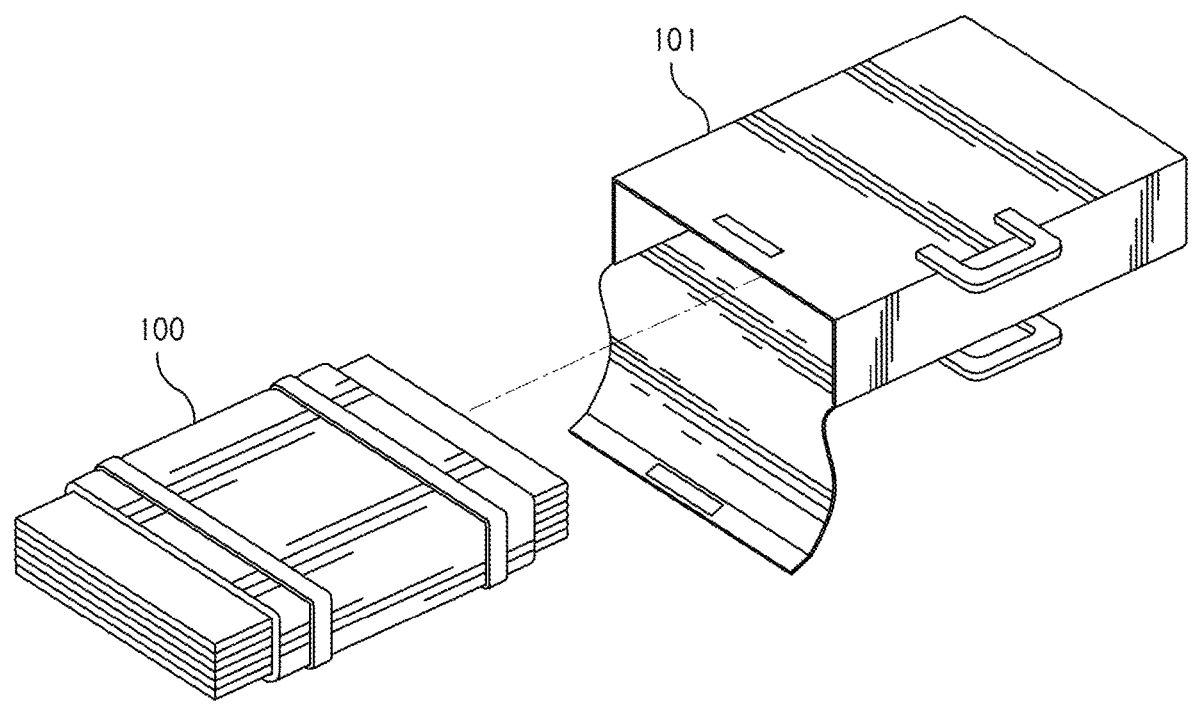
FIG. 1 is an isometric view of a folded car cover according to the present invention being removed from its storage case.

FIG. 1 is an isometric view of a car cover 100 according to the present invention being removed from its storage case 101. In a preferred embodiment, car cover 100 is formed of three layers: two water resistant layers (e.g. Dintex™) encasing an insulating layer (e.g. ¼" Low-E™). Conventional car covers have only a single layer and hence are not thick or stiff enough to protect cars.

Figure 2:
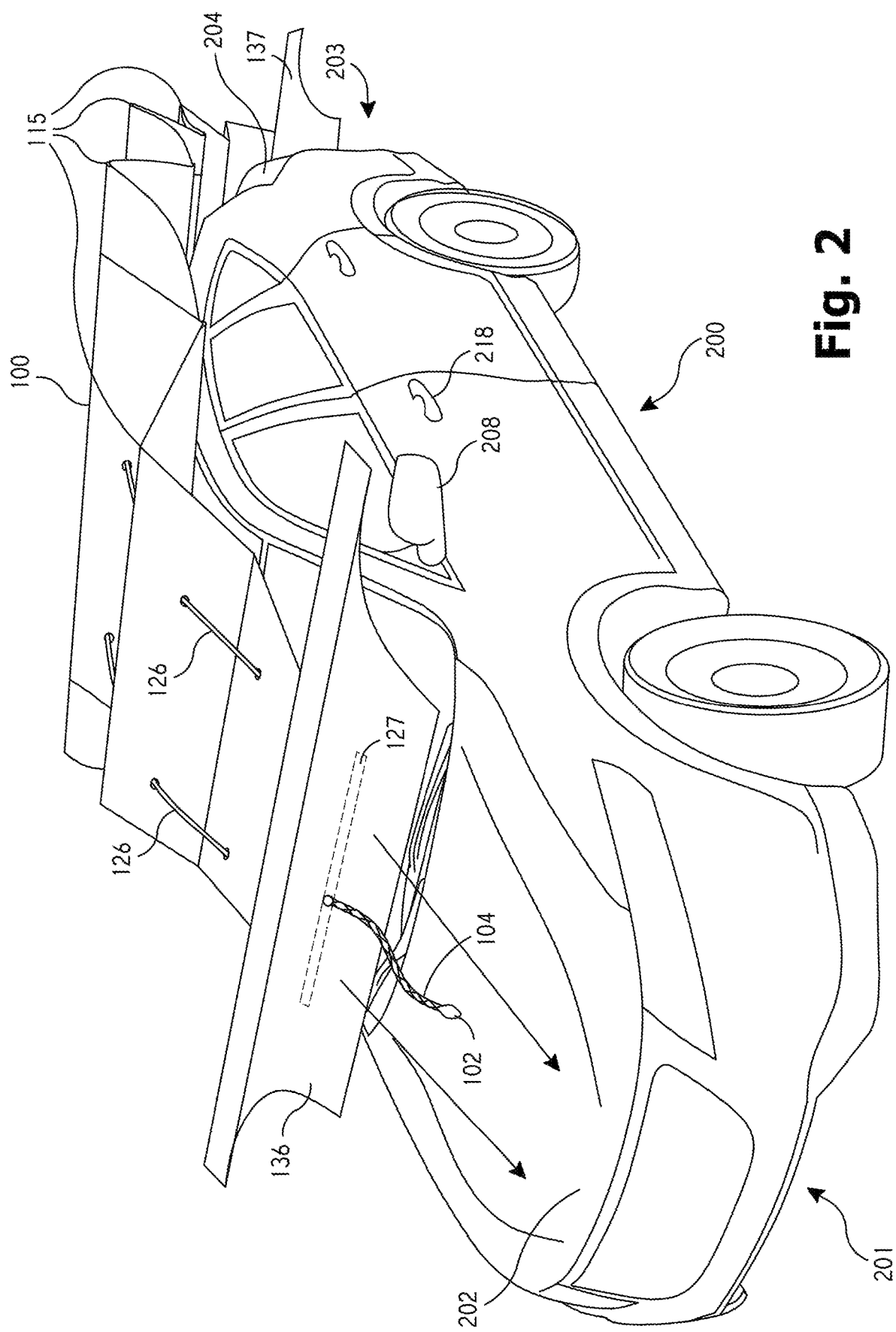
FIG. 2 is an isometric view of a first embodiment of the car cover of FIG. 1 being deployed on a car.

FIG. 2 is an isometric view of car cover 100 of FIG. 1 being deployed on a car 200. Car cover 100 is especially useful for protecting a car from hail. In this embodiment, the owner begins deploying car cover 100 by hooking the back of cover 100 to the inside of the trunk 204 (see FIGS. 4 and 5). Cover 100 is then pulled forward over car 200 by pulling cover-deploying strap 104 via handle 102. Cover 100 comprises a plurality of top panels 103 which are unfolded like an accordion along fold lines 115, preferably reinforced. Refolding cord 126 will be used to refold cover 100. Top panels 103 might be around 10" each.

Figure 3A:
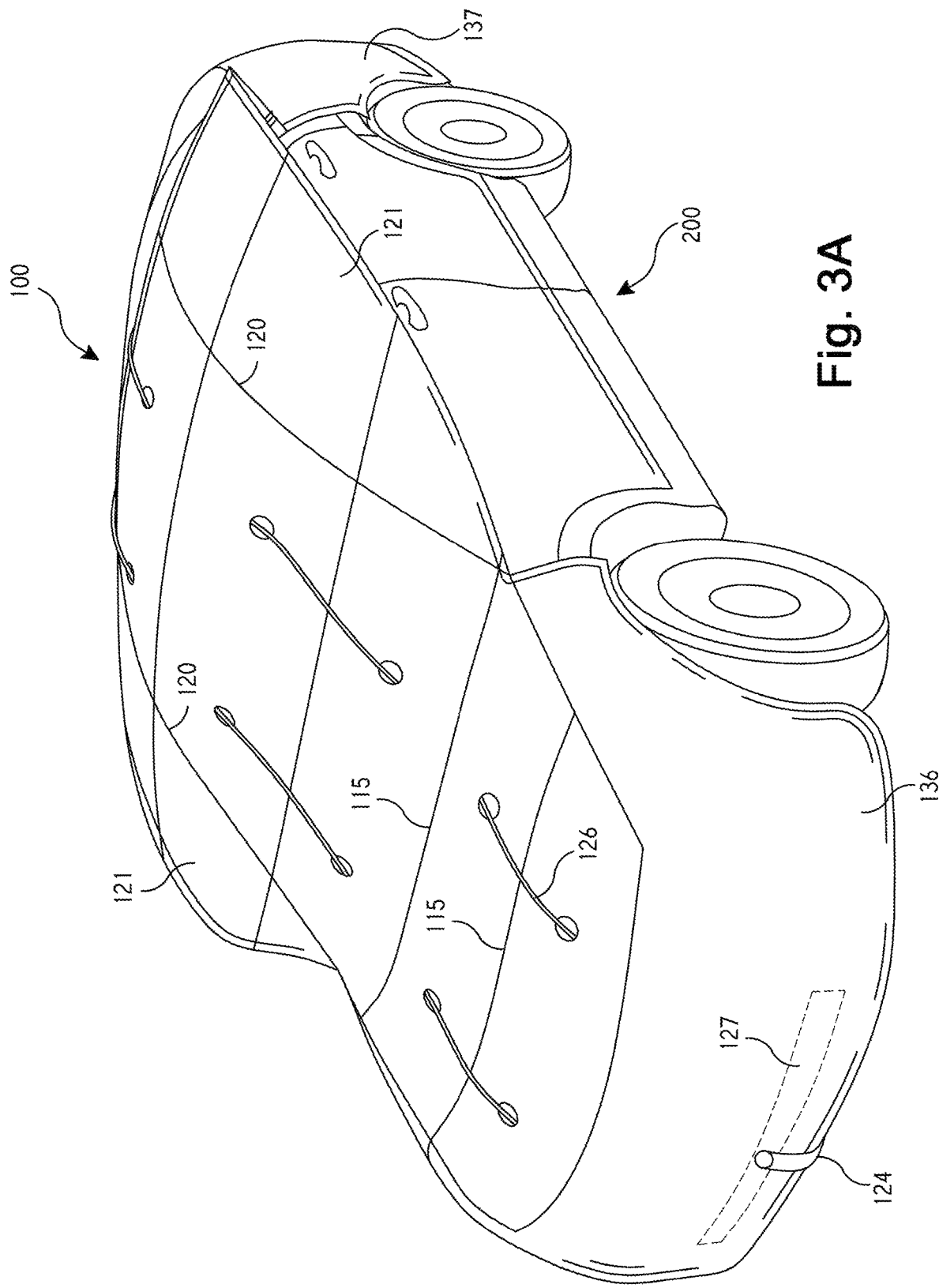
FIG. 3A is an isometric view of the car cover of FIG. 2 after being deployed on a car with the umbrella flaps extended.
Figure 3B:
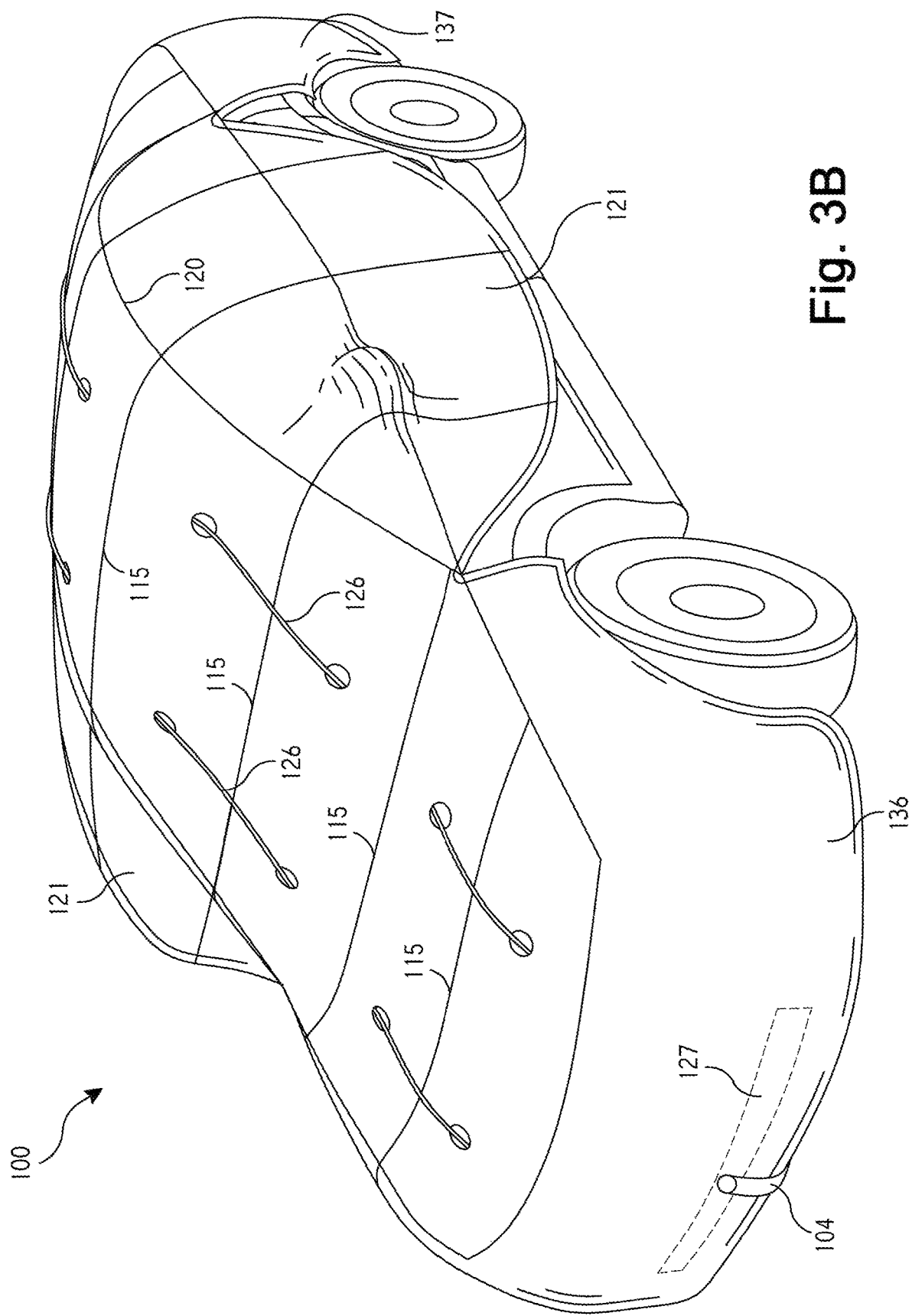
FIG. 3B is an isometric view of the car cover of FIG. 1 after being deployed on a car with one umbrella flap extended and one folded down.

FIG. 3A is an isometric view of car cover 100 after being deployed on car 200, with umbrella wings 121 extended. FIG. 3B is an isometric view of car cover 100 after being deployed on car 200, with left wing 121 extended and right wing 121 folded down. After cover 100 is pulled forward, a hook 123 (see FIGS. 4 and 5) attached to front hook strap 124 attaches to the front of car 200 (for example under the bumper), front wraparound panel 136 is attached around the front end of car 200, and rear wraparound panel 137 is attached around the rear of car 200, for example with hook-and-loop attachments. In the embodiment of FIG. 3, umbrella wings 121 extend outward over the sides of car 200. This allows the owner to get into the car after deploying car cover 100. wings 121 might extend around 17 inches, which, when folded down as in FIG. 7, would cover one-half to two-thirds of the car doors, depending on the model.

In some embodiments, cover 100 is further attached to car 200 for security. For example, elastic loops might hook around car side mirrors 208 and via car door handle straps 119.

Figure 4:
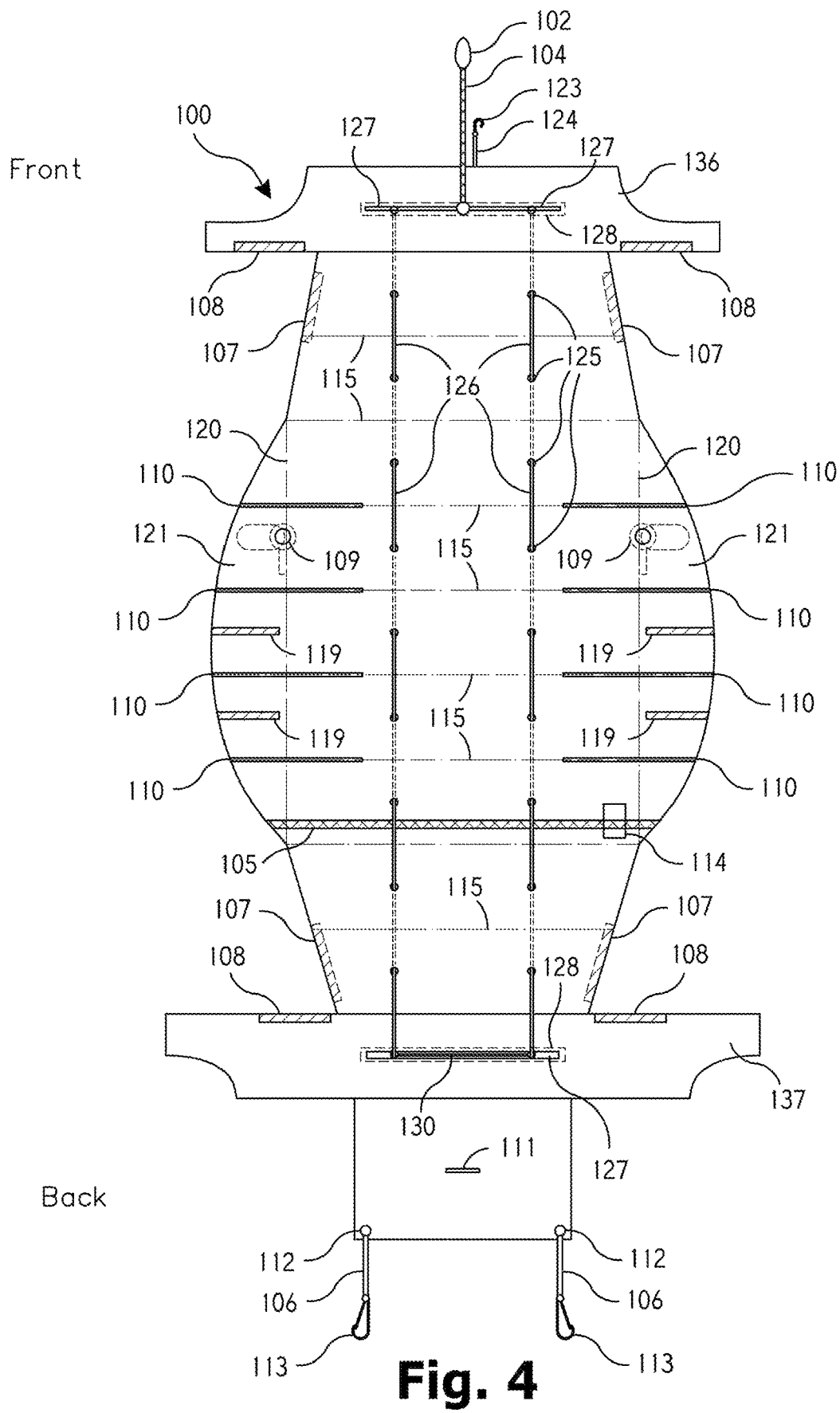
FIG. 4 is a schematic top plan view of the car cover of FIG. 2.
Figure 5:
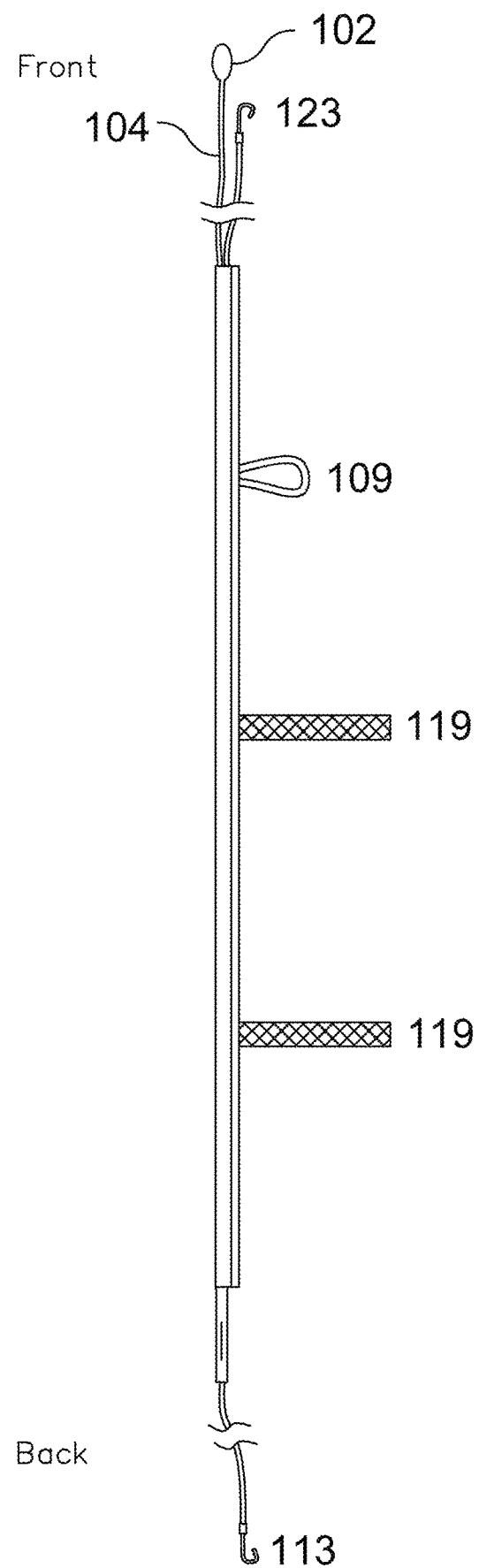
FIG. 5 is a schematic side view of the car cover of FIG. 2.

FIG. 4 is a schematic top plan view of the cover 100, showing several useful features. FIG. 5 is a schematic side view of cover 100.

As shown in FIGS. 2, 3A, and 3B, cover 100 folds and unfolds at accordion folding lines 115. Refolding cord 126 threads through grommets 125 and is used to refold cover 100, by pulling refolding cord portion 130 at rear reinforcement panel 127 in reinforced pocket panel 128. In some embodiments, refolding cord 126 is elastic, so cover 100 begins to refold itself when released.

Cover deploying handle 102 is attached to front reinforcement panel 127 via strap 104. Front hook 123 on strap 124 is used to attach the front of cover 100 to the front 201 of car 200, e.g. at hood 202. Back clips 113 attach cover 100 at the rear 203 of car 200, preferably inside trunk 204 via straps 106 attached to cover 100 at grommets 112. Securing slit 111 allows the trunk to latch. In some embodiments, there is an additional strap 105 for securing cover 100 to car back tires via clips 114

In this embodiment, front wrap-around panel 136 wraps around the front 201 of car 200 and is attached to cover 100 via hook-and-loop material 107, 108. Similarly, back wrap-around panel 137 wraps around the rear 203 of car 200 and is attached to cover 100 via hook-and-loop material 107, 108. Elastic window straps 109 may be attached to car side-view mirrors 208.

Wings 121 are preferably reinforced by wing rods 110, and may be extended outward to form umbrella protection and to allow the owner to enter car 200, or may be folded down at car edge fold lines 120. In the latter case, straps 119 may attach wings 121 to car handles 218, for example via hook-and-loop connection.

Figure 6:
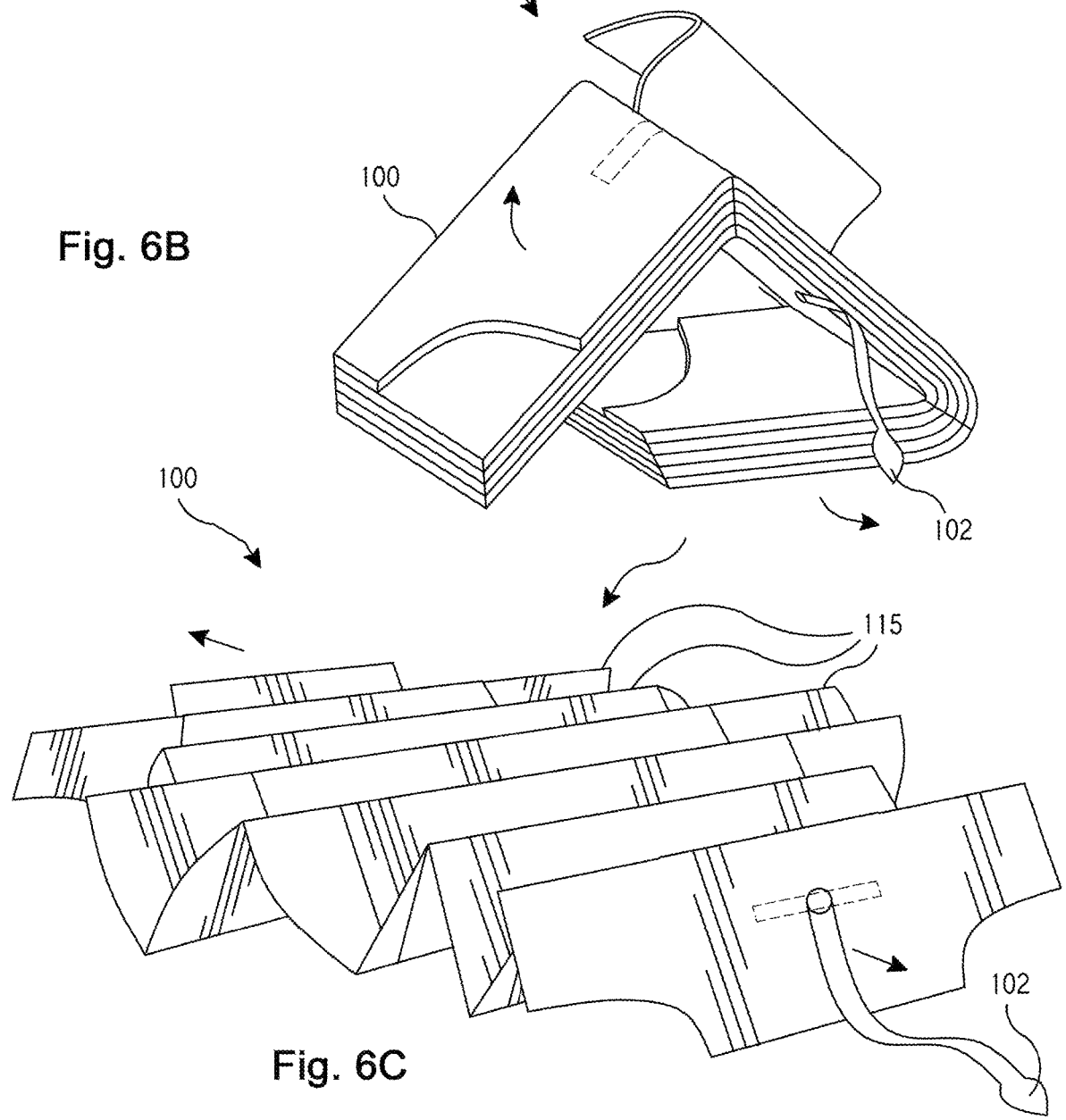
FIGS. 6A, 6B, and 6C are isometric figures showing the car cover of FIG. 2 being unfolded prior to deployment

FIGS. 6a, 6b, and 6c are isometric figures showing car cover 100 being unfolded prior to deployment. FIG. 6a shows cover 100 still folded. The flap which attaches the car cover inside the trunk wraps around the folded car cover, which is then secured by straps. FIG. 6b shows cover 100 being unfolded. This shows how the car cover flap is unfolded first allowing the deploying of the car cover. Cover-deploying handle 102 is visible. In FIG. 6b, cover 100 is being extended via accordion folds 115 for deployment.

Figure 7:
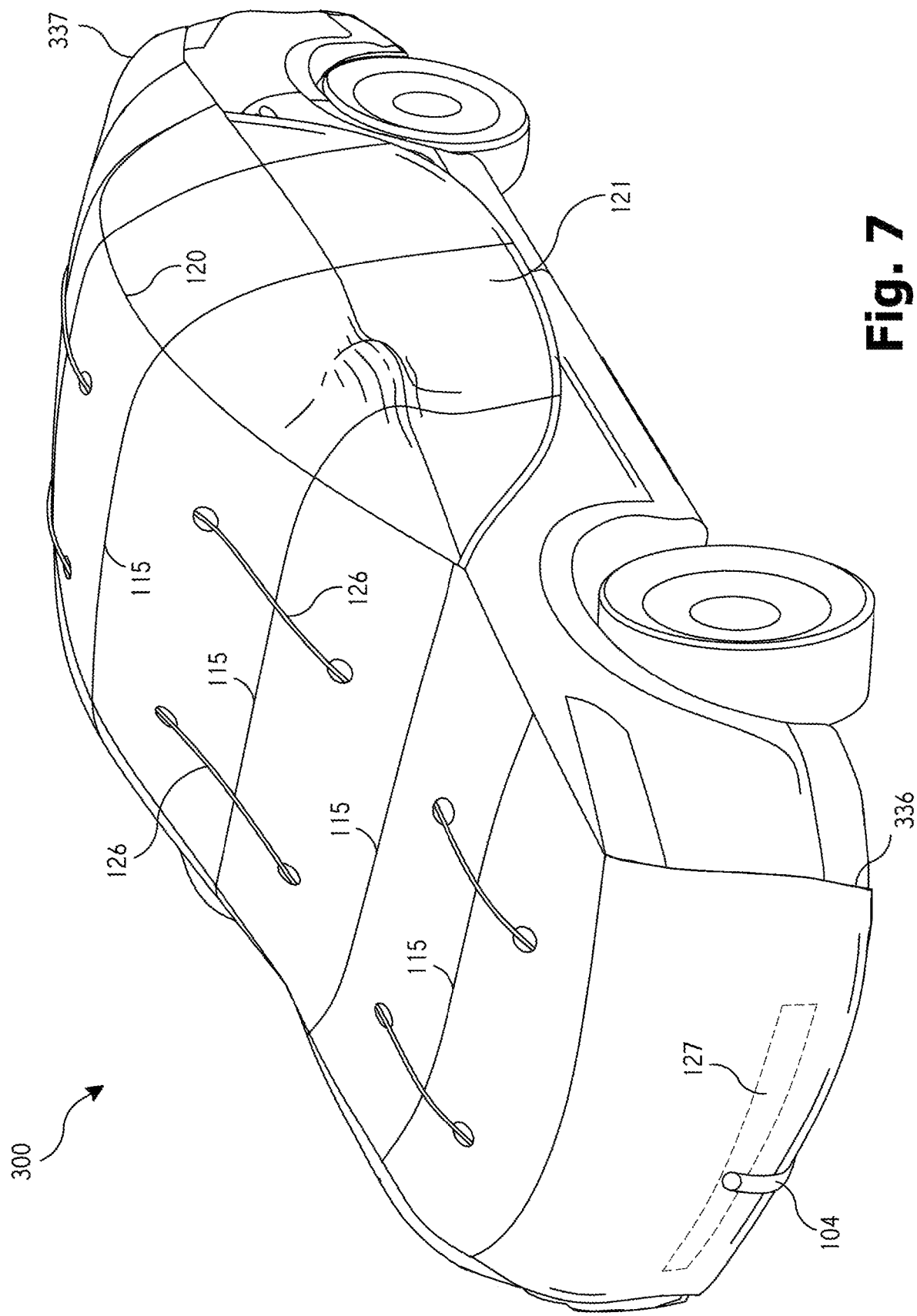
FIG. 7 is an isometric view of a second embodiment of the car cover of FIG. 1 after being deployed on a car with umbrella flaps folded down.
Figure 8:
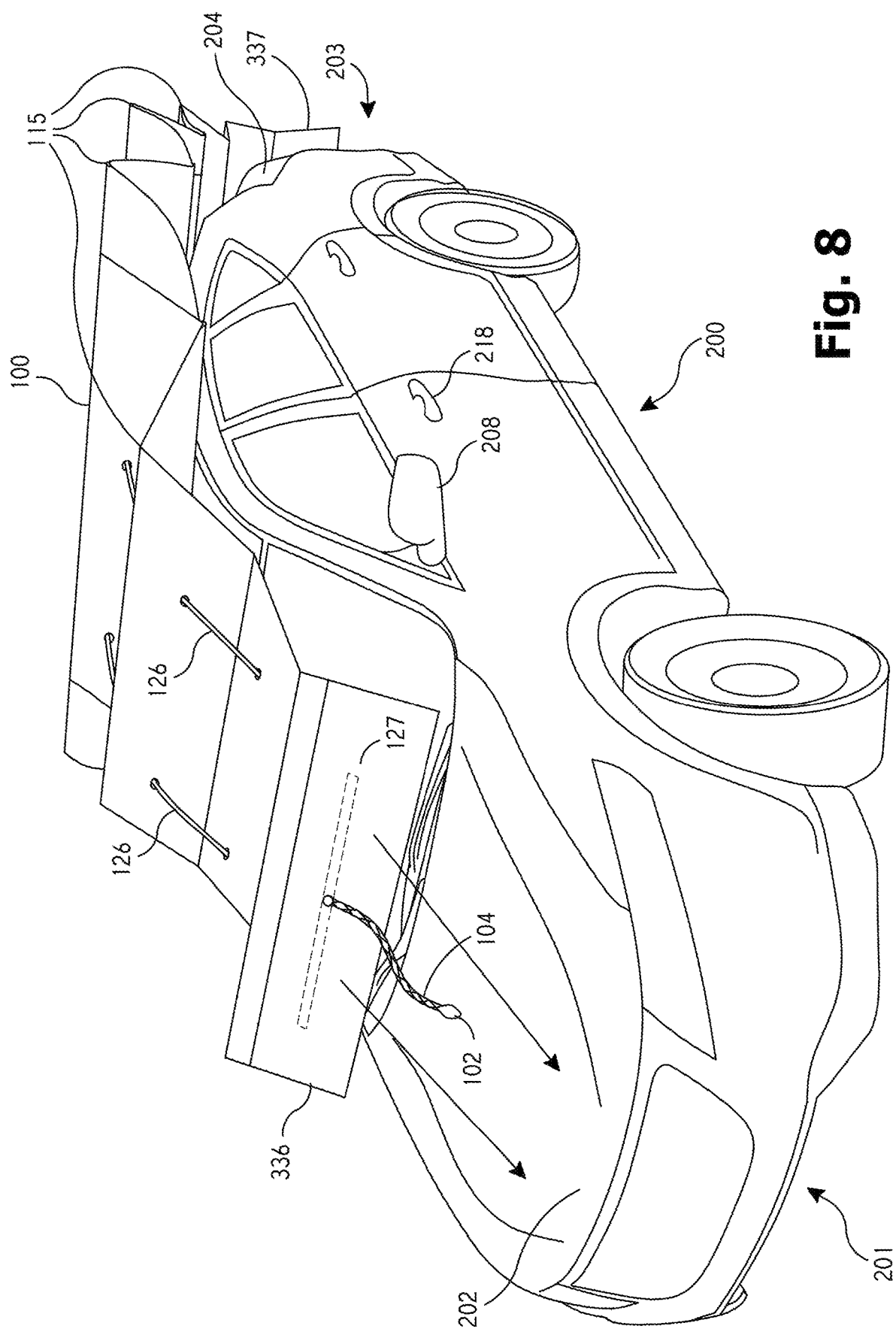
FIG. 8 is an isometric view of a second embodiment of the car cover of FIG. 7 in the process of being deployed on a car.
Figure 9:
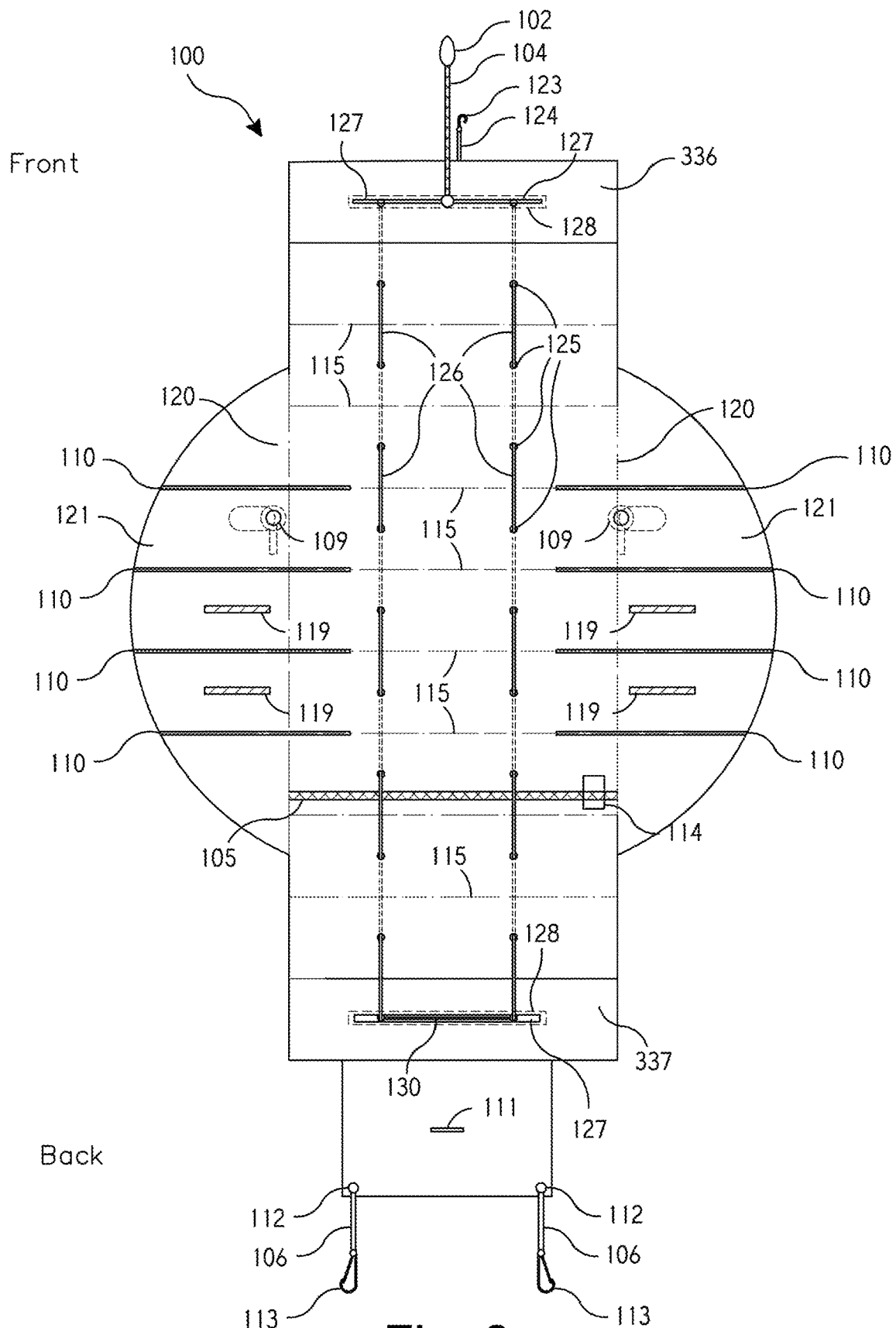
FIG. 9 is a schematic top plan view of the car cover of FIG. 7.

FIGS. 7-9 show a second embodiment 300 of a car cover according to the present invention. This embodiment is especially useful for protecting a car from snow, ice, sun, sap, and dust. Similar elements have similar reference numbers.

FIG. 7 is an isometric view of second embodiment 300 after being deployed on car 200, with wings 121 folded down. They may be secured to car door handles 218 via straps 119 and to side mirrors via elastic straps 109. The embodiment of FIG. 7 is different than that of FIGS. 1-6c in that wings 121 are wider, and hence may be deployed in an extended mode (as in FIG. 7) or in a folded down mode that covers more of the car 200 (as in the right side of FIG. 3B). FIG. 3B is an isometric view of the car cover of FIG. 7 after being deployed on a car with one umbrella flap extended and one folded down. This version of embodiment 300 varies slightly from that of FIG. 9 in that non-wrap-around front panel 336 and non-wrap-around rear panel 337 replace front wrap-around panel 136 and rear wrap-around panel 137, as well as having a slightly different shape (See FIG. 9 as well).

FIG. 8 is an isometric view of car cover 300 in the process of being deployed on a car. Wings 121 are folded under and hence not visible. FIG. 9 is a schematic top plan view of the version of car cover 300 shown in FIG. 8.

While the exemplary preferred embodiments of the present invention are described herein with particularity, those skilled in the art will appreciate various changes, additions, and applications other than those specifically mentioned, which are within the spirit of this invention. For example, those skilled in the art will appreciate that features from various embodiments may be mixed and matched (such as wrap-around panels, various combinations of securing straps, shapes and sizes of panels, wings, etc.

What is claimed is:

1. A car cover for covering a car comprising:
   a plurality of top panels configured to unfold and refold along fold lines;
   a front attachment for attaching a front end of the car cover to a front end of the car;
   a back attachment for attaching a back of the car cover to a back of the car;
   grommets attached to holes formed in the top panels;
   a refolding cord threaded through the grommets and configured to refold the top panels when pulled;
   wings formed along the edges of the top panels and configured to selectively either extend outward from the top panels or fold downward over car sides; and
   wing rods attached to the wings and configured to reinforce and stiffen the wings.

2. The car cover of claim 1 wherein the refolding cord is elastic.

3. The car cover of claim 1, further comprising hook and loop connections for attaching the car cover to car door handles.

4. The car cover of claim 1, further comprising elastic straps for attaching the car cover to car side windows.

5. The car cover of claim 1 further comprising a cover deploying handle at a front end of the car cover, the cover deploying handle configured to unfold the top panels when the back attachment is attached to a car trunk and the cover deploying handle is pulled.

6. The car cover of claim 1 further comprising a front panel configured to wrap around a front bumper of the car and a rear panel configured to wrap around a back bumper of the car.

7. The car cover of claim 1 wherein the top panels comprise an insulating layer and a water resistant layer.

8. A method of covering a car for protecting the car comprising the steps of:
   (a) forming a car cover with foldable panels and wings formed at the sides of the of the cover, the wings having attached wing rods configured to reinforce and stiffen the wings, the wings configured to selectively either extend outward from the cover or fold downward over car sides;
   (b) attaching a first end of the car cover to a first end of the car;
   (c) pulling the car cover over the car using a handle attached to a second end of the car cover;
   (d) attaching the second end of the cover to the second end of the car; and
   (e) unfolding the wings formed at the sides of the cover.

9. The method of claim 8 wherein step (e) includes the step of unfolding one of the wings to extend outward from a side of the car cover over a car door.

10. The method of claim 8 wherein step (e) unfolds the wings to extend downward over sides of the car.

11. The method of claim 8, further comprising the steps of:
   (f) unattaching the first end of the car cover from the first end of the car and the second end of the car cover from the second end of the car; and
   (e) folding the cover by pulling a refolding cord threaded through grommets through the top panels.

12. The method of claim 8 wherein the first end of the car includes a trunk and wherein step (b) includes the step of shutting a flap on the car cover in the trunk.

13. The car cover of claim 7 wherein the cover comprises an additional water resistant layer, and wherein the two water resistant layers encase the insulating layer.

14. The car cover of claim 13 wherein the insulating layer is at least about ¼" thick.

15. The car cover of claim 13 wherein the two water resistant layers comprise Dintex™ and the insulating layer comprises LowE™.

16. The car cover of claim 15 wherein the insulating layer is at least about ¼" thick.

17. The car cover of claim 1 wherein the top panels are about 10" deep.

18. The car cover of claim 1 further comprising a flap configured to be shut inside a trunk of the car.

19. The car cover of claim 18, further comprising a slit formed within the flap, the slit configured to allow a trunk latch to extend through the flap.

\* \* \* \* \*